Dec. 4, 1951     J. A. TROENDLE     2,577,385
METHOD AND MEANS FOR THE TAKEOFF OF AIRCRAFT
Filed Sept. 19, 1947     7 Sheets-Sheet 1

INVENTOR
JEAN A. TROENDLE
BY
ATTORNEY

Dec. 4, 1951        J. A. TROENDLE        2,577,385
METHOD AND MEANS FOR THE TAKEOFF OF AIRCRAFT Filed Sept. 19, 1947        7 Sheets-Sheet 2

INVENTOR
JEAN A. TROENDLE
BY
ATTORNEY

Dec. 4, 1951  J. A. TROENDLE  2,577,385
METHOD AND MEANS FOR THE TAKEOFF OF AIRCRAFT
Filed Sept. 19, 1947  7 Sheets-Sheet 3

INVENTOR
JEAN A. TROENDLE
BY
ATTORNEY

Dec. 4, 1951 J. A. TROENDLE 2,577,385
METHOD AND MEANS FOR THE TAKEOFF OF AIRCRAFT
Filed Sept. 19, 1947 7 Sheets-Sheet 4

INVENTOR
JEAN A. TROENDLE

Dec. 4, 1951        J. A. TROENDLE        2,577,385
METHOD AND MEANS FOR THE TAKEOFF OF AIRCRAFT
Filed Sept. 19, 1947        7 Sheets-Sheet 6

INVENTOR
JEAN A. TROENDLE

Patented Dec. 4, 1951

2,577,385

UNITED STATES PATENT OFFICE 2,577,385

METHOD AND MEANS FOR THE TAKE-OFF OF AIRCRAFT

Jean A. Troendlé, Geneva, Switzerland

Application September 19, 1947, Serial No. 774,929

4 Claims. (Cl. 244—102)

This invention relates to an improved method for take-off of aircraft, and means for carrying the same into practice.

A primary object of the invention is to effect a material reduction of the air drag exerted on the landing gear during take-off at a time where the demand for power from the power plant is at its maximum, thereby resulting in either a shortening of the minimum take-off run with a prescribed load, or an increase of the load capacity for a prescribed length for the take-off run.

A more specific object resides in the method and means for retracting a portion of the landing gear during take-off at a time where the aircraft is still traveling on the ground, whereby an advantageous reduction in air drag is obtained. This objective may be carried out with various types of landing gear.

For example, in a retractable landing gear of the bicycle type, it is possible to provide a forward wheeled strut and a wheeled main strut in the vertical axial plane of the ship, the main strut being movably mounted to allow forward longitudinal shifting of the wheel or wheels of the main strut from a normal position in back of the center of balance of the aircraft to an advanced position just below said center of balance.

Also, by way of further example, the scope of the invention includes a retractable landing gear of the tricycle type which comprises a wheeled front strut and a pair of wheeled main struts, the said pair of main struts being movably mounted to allow longitudinal forward motion of their wheels from a normal position in back of the center of balance of said aircraft to an advanced position in the vertical transverse plane through said center of balance.

Moreover, the invention is also applicable and highly useful in connection with retractable landing gear comprising a wheeled forward strut and more than two pair of wheeled main struts, one pair of said main struts being mounted centrally, that is in the vertical transverse plane intersecting the center of balance of the aircraft, while the other pair is mounted in back of said transverse plane, all of said struts being actuated or controlled by appropriate means for retracting said wheeled forward strut and the back pair of main wheeled struts, while said central pair of wheeled struts still support the aircraft on its take-off run.

With the above and other objects in view, which will more readily appear as the nature of the invention is better understood, the same consists in the combination and arrangement of parts hereinafter more fully described, illustrated and claimed.

The drawings diagrammatically illustrate by way of example, not by way of limitation, several forms of embodiment of the invention.

Similar references designate corresponding parts throughout the several figures of the drawing.

Figure 1:
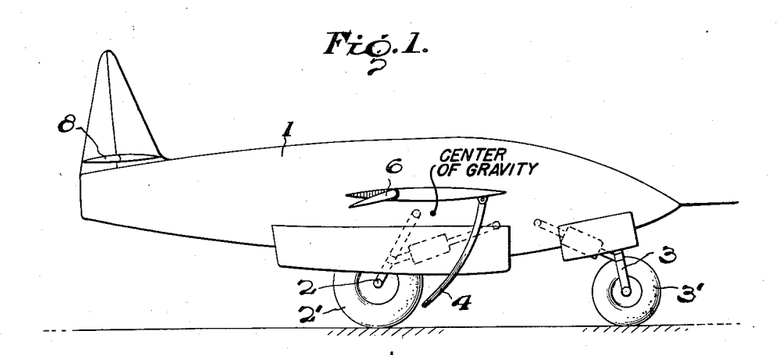
Figure 1 is a side view of an aircraft illustrating the first form of embodiment of the invention, and including a landing gear of the bicycle type.
Figure 2:
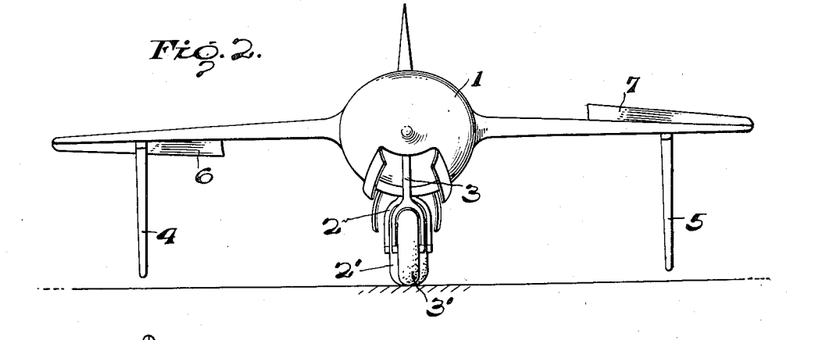
Figure 2 is a front view of the aircraft shown in Figure 1.
Figure 3:
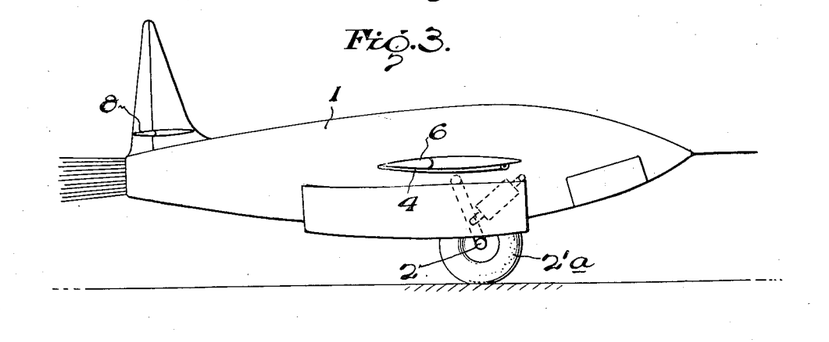
Figure 3 is a side elevation of the aircraft shown in Figure 1 in a later stage of the take-off run.

Referring to Figures 1, 2 and 3, an aircraft 1 is shown resting upon the ground through a landing gear of the bicycle type and including a main strut 2 having the main wheel 2′ and the front strut 3 having the nose wheel 3′, said aircraft being stabilized against roll by two wing supports 4 and 5.

When the aircraft is running on the ground during the first part of the take-off, as soon as the speed is sufficient to obtain roll and pitch control by means of ailerons 6 and 7 and elevator 8, main wheel 2′ is moved forward to the advanced position 2′a shown in Figure 3. This position is selected in the vertical transverse plane containing the center of balance of the aircraft 1, namely, the point through which the ground reaction exerted by the ground on the main wheel must pass in order to keep the balance of other forces exerted on the aircraft. In the case illustrated in Fig. 3, the center of balance is disposed slightly forward of the center of gravity when the craft is moving, although the two coincide when the ship is at rest. While the craft is moving on the ground, the force of forward motion is exerted along the axis of the craft above the line along which the force of drag is exerted by air and ground contact. The force of forward motion and the drag therefore create a clockwise torque as viewed in Fig. 3. This torque can be overcome by raising the elevator, but this increases air drag, which is undesirable. Consequently, it is better to provide a counter-torque by advancing the wheel to the position 2′a slightly forward of the center of gravity; i. e. immediately below the center of balance. Almost immediately thereafter the nose wheel 3′ and the two wing supports 4 and 5 are retracted with the result of reducing about one-half the total drag otherwise exerted on the complete landing gear with the nose wheel and the wing supports in projected positions. After the airplane is airborne, the main wheel is retracted, for example, by moving the main strut 2 upward and back to an extreme rear position so that the main wheel 2′ is retracted into the fuselage.

Figure 4:
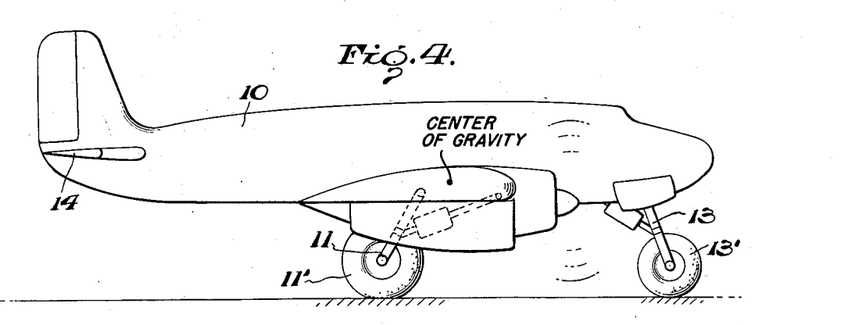
Figure 4 is a side view of an aircraft illustrating a second embodiment of the invention as applied to a landing gear of the tricycle type.
Figure 5:
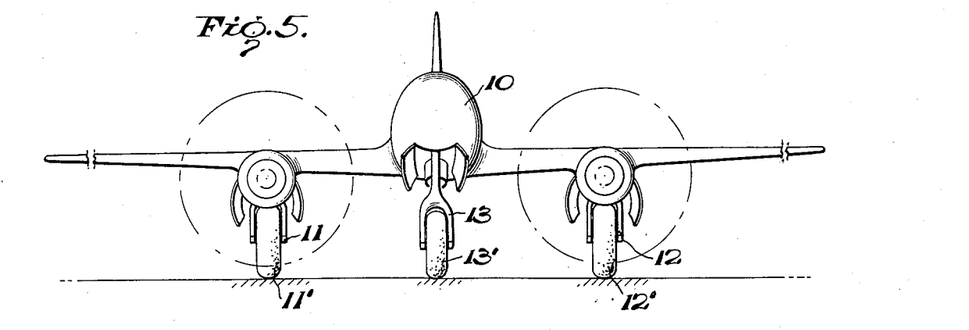
Figure 5 is a front view of the aircraft shown in Figure 4.
Figure 6:
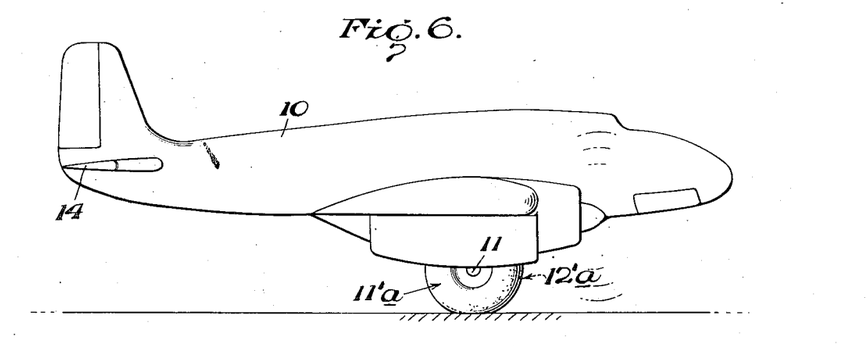
Figure 6 is a side elevation of the aircraft shown in Figure 4 in a subsequent stage of the take-off run.

Figures 4, 5 and 6 illustrate the embodiment of the invention in an aircraft supported by a tricycle type of landing gear. In these figures the aircraft 10 is supported at rest on the ground by a pair of struts 11 and 12 equipped with main wheels 11′ and 12′, and by nose strut 13 having nose wheel 13′.

When the aircraft of Figure 4 is running on the ground during the first part of take-off, as soon as the speed is sufficient to obtain longitudinal or pitch control by means of elevator 14, the main wheels 11′ and 12′ are moved forward to the advanced positions as indicated at 11′a and 12′a in Figure 6. This forwardly advanced position is selected as previously described in connection with Figures 1–3.

Thereafter, the nose wheel 13′ is retracted with the result of a reduction of about one-third of the total drag exerted on a complete landing gear with the nose wheel in operating position. It is important to observe that this reduction of drag takes place in the later part of the take-off run and will be beneficial then as well as in the beginning of the flight, namely, at times where the demand for power from the power plant is at its maximum. Later on, when the aircraft is in flight, the main wheels will be retracted, and when the aircraft is made ready for the next landing, said main landing wheels will move to their normal back position shown in Figure 4, while the nose wheel is simultaneously projected to its normal landing position.

Figures 7 to 11, inclusive, illustrate an aircraft 20 having a landing gear comprising three main struts, namely, a pair of struts 21—22 and a third strut 23, respectively equipped with the three main wheels 21′, 22′ and 23′, and the front strut 24 having a nose wheel 24′. The paired wheels 21′ and 22′ are located in the position of longitudinal balance of the aircraft as previously set forth in connection with Figures 1 to 3. The wheel 23′ has its axis located to the rear of wheels 21′ and 22′, and the nose wheel 24′ may have any of the usual positions adopted for aircraft.

Figures 9, 10, 11:
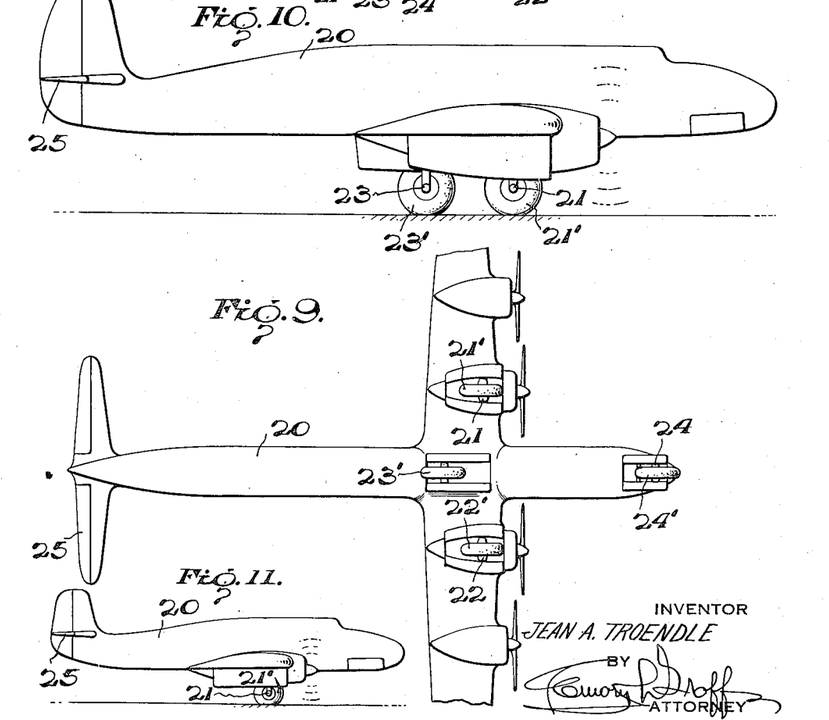
Figure 9 is a bottom plan of the aircraft shown in Figure 7.
Figures 10 and 11 are side elevations of the aircraft shown in Figure 7 in later stages of the take-off run.

When the aircraft of Figures 7 to 11, inclusive, is running on the ground during the first part of the take-off, as soon as the speed is sufficient to obtain pitch control by means of elevator 25, the nose wheel 24′ is retracted as shown in Figure 10. As the aircraft speed increases, the main wheels become partially unloaded owing to the increasing wind lift up to the point where the single rear wheel 23′ may be retracted by appropriate control means provided to that end. During the later stage of the take-off run and the beginning of flight, there remains only the pair of wheels 21′—22′ to cause drag on the aircraft as shown in Figure 11.

Figures 12, 13, 14, 15, 16:
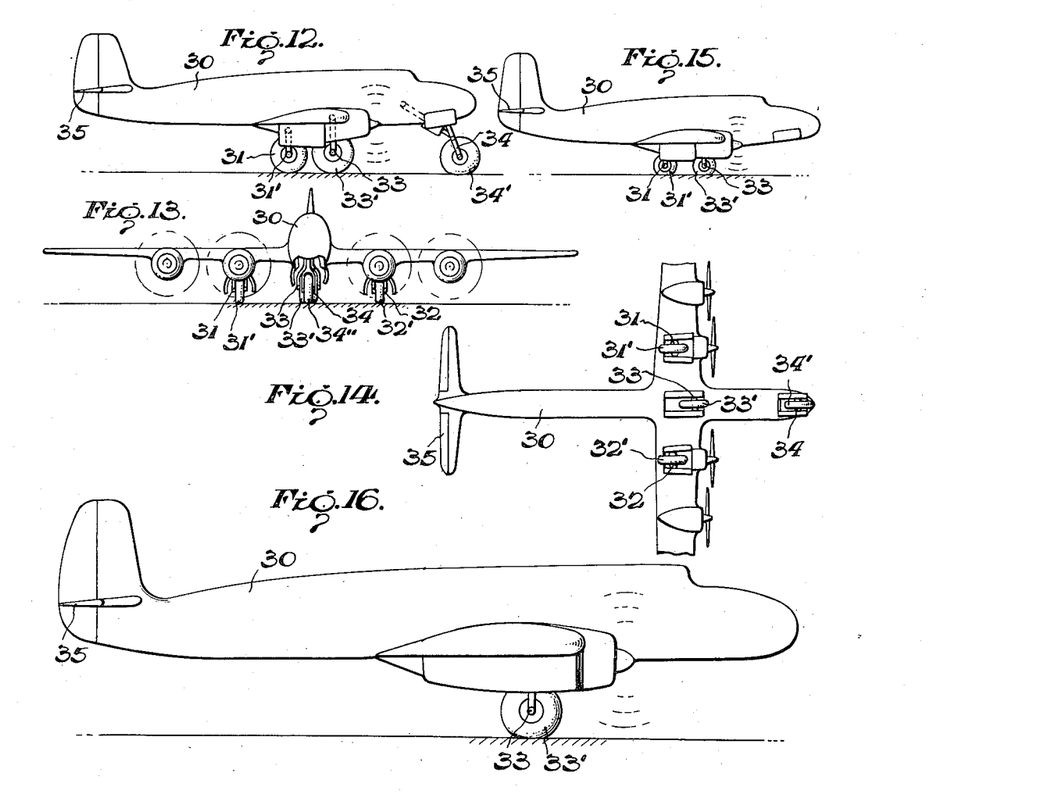
Figure 12 is a side elevation of another aircraft within the scope of the third form of the invention, and including three main struts carrying the main wheels, and with a wheeled front strut.
Figure 13 is a front elevation of the aircraft shown in Figure 12.
Figure 14 is a bottom plan view of the aircraft shown in Figure 13.
Figures 15 and 16 are side elevations of the aircraft shown in Figure 12 in successive later stages of the take-off run.
Figure 17:
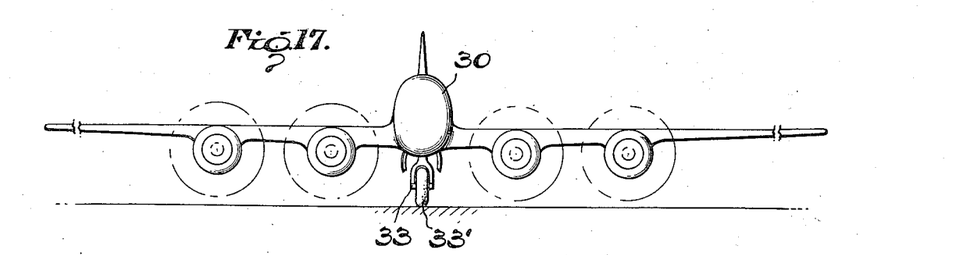
Figure 17 is a front elevation of the aircraft as it appears in Figure 16.
Figure 18:
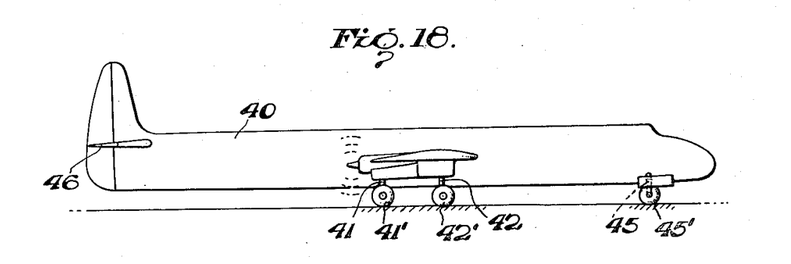
Figure 18 is a side view of another aircraft within the third form of the invention, and including four main struts carrying the main wheels and a front strut having a double nose wheel.
Figure 19:
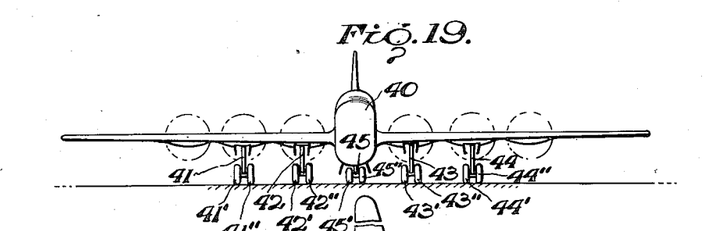
Figure 19 is a front elevation of the aircraft shown in Figure 18.
Figure 20:
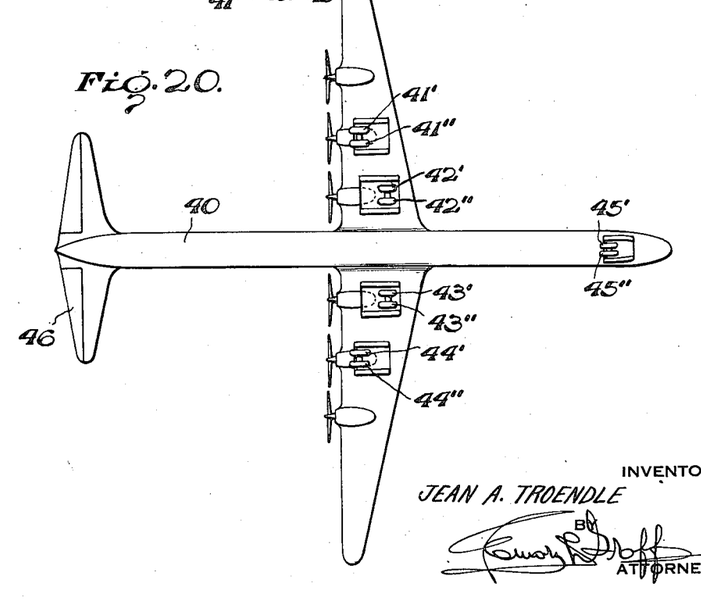
Figure 20 is a bottom plan view of the aircraft shown in Figure 18.

From the foregoing, it will be apparent that by following the same procedure, the main wheels could be arranged in a slightly different manner as shown in Figures 12 to 14 inclusive. For example, one main wheel 33′ would be mounted in the position of balance and the pair of main wheels 31′—32′ would be mounted farther to the rear. With this arrangement, it will be necessary for the aircraft 30 to reach a greater air speed before retracting its main back wheels than that required with the previous arrangement of Figures 7 to 11 for retracting the single back main wheel 23′. This is done in order to avoid overload of the now only remaining single main wheel 33′ left to support the aircraft on the ground. This apparent disadvantage may be compensated by the fact that during the later part of the take-off just one main strut and wheel cause air drag as shown in Figures 16 and 17.

Figure 21:
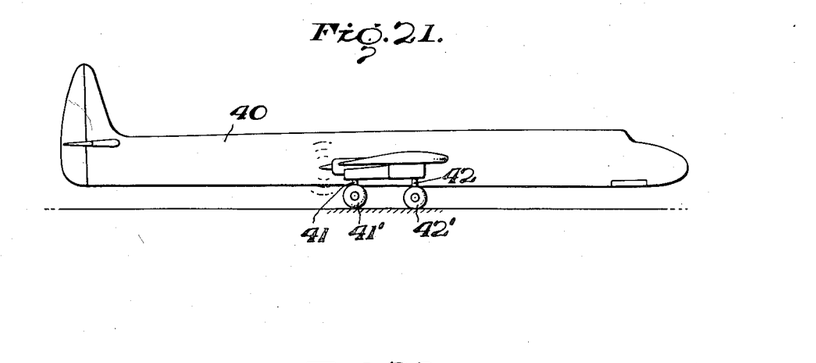
Figures 21 and 22 are side elevations of the aircraft shown in Figure 18 in later stages of the take-off run.
Figure 22:
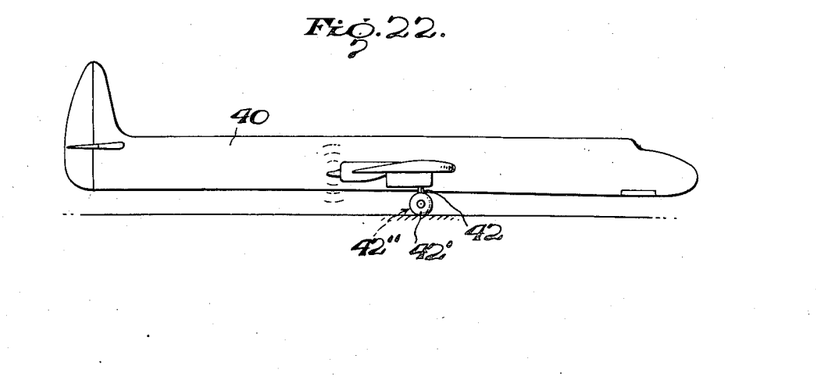
Figure 23:
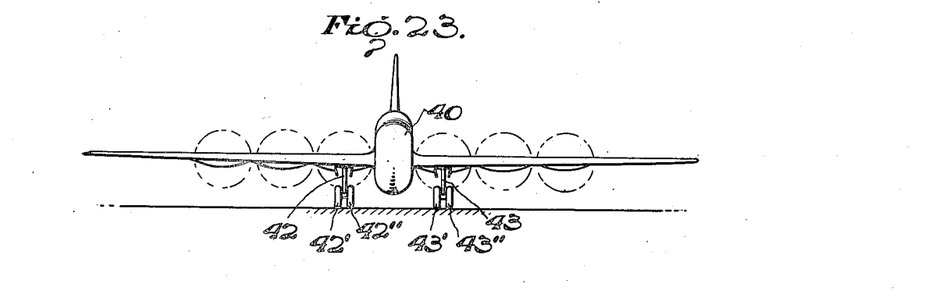
Figure 23 is a front elevation of the aircraft shown in Figure 22.

Figures 18 to 23 inclusive illustrate an aircraft 40 provided with a retractable landing gear comprising four main struts 41, 42, 43 and 44, each equipped with a pair of landing wheels 41′, 41″, 42′, 42″, 43′, 43″, 44′, 44″, and with a front strut 45 equipped with a double nose wheel 45′ and 45″. Wheels 42′, 42″ and 43′, 43″, for convenience called central main wheels, are located in the position of longitudinal or pitch balance as previously defined in connection with Figures 1 to 3. Wheels 41′, 41″, and 44′, 44″ are located farther back than said position of pitch balance. Similarly to what has been said in connection with the aircraft of Figures 7 to 11, the double nose wheel 45′, 45″ is retracted as shown in Figure 21, when the air speed of the aircraft is sufficient; thereupon wheels 41', 41'' and 44', 44'' are brought into their retracted position as shown in Figure 22. Thus, there are only left wheels 42', 42'' and 43' and 43'' capable of producing drag during the later part of the take-off run and the beginning of flight. Here again, the air speed of the aircraft required before retracting the main wheels 41', 41'', and 44', 44'' depends upon the aerodynamic characters of the aircraft and its load.

Figure 24:
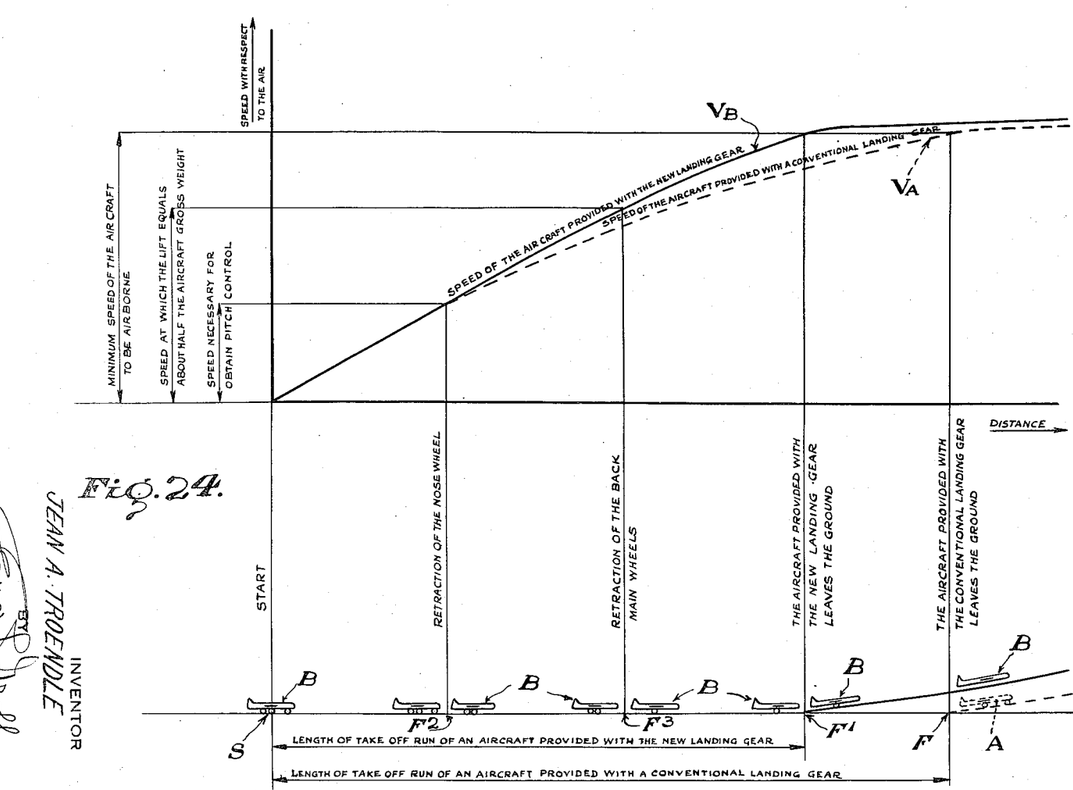
Figure 24 is a diagram showing the comparative behavior of an aircraft provided with landing gear according to the present invention and the same aircraft with a conventional landing gear.

With reference to Figure 24, the top of the figure represents the variation of the speed $V_A$ and $V_B$ of two aircrafts of identical design except for their landing gear. Aircraft A is equipped with a conventional landing gear comprising a double nose wheel and four main legs equipped with a main wheel pair. All main wheels are located in one single row at right angle with the longitudinal axis of the aircraft back of the center of pitch balance previously defined. Aircraft B is equipped with a landing gear according to the invention described with respect to Figures 18 to 23. Two pairs of main wheels are located just below the center of pitch balance, the other main wheels being mounted in their conventional manner in back of said center of pitch balance.

In the lower half of Figure 24 it may be assumed that both planes would start from position S. The conventional plane A shown by dotted lines does not become airborne until it reaches the point F. On the other hand, the aircraft B provided with the new landing gear becomes airborne at point F'. It may be seen that from position S to $F^2$ there is no difference between the behavior of the two aircrafts. At position $F^2$, when the speed of aircraft B is sufficient to insure pitch control, its nose wheels are retracted producing a reduction in the drag as compared to that exerted on aircraft A. The result is an increase of acceleration. In position $F^3$, it is assumed that the speed produces a lift equaling about half the gross weight of aircraft B. Without increasing the wheel load over what it was at standstill, the main back wheels of aircraft B are retracted producing a further reduction in the air drag as compared with that exerted on aircraft A. In résumé, from position $F^3$ to F' aircraft B has only its center main wheels in operating position and producing drag on the aircraft. It may thus be plainly seen why aircraft B equipped with the new landing gear operated in the manner specified is capable of taking to air at position F' while aircraft A equipped with a landing gear of conventional design takes a longer run, up to position F to take to the air, that is to say, reach a speed relative to the air sufficient to produce a lift capable of bearing the total gross weight of the aircraft and of producing the minimum lift required for vertical acceleration.

Further, an accurate plot of both speed curves shows a considerably greater slope of curve $V_B$ in position F' than curve $V_A$ in position F. It therefore becomes clear that the accumulated difference in speed results in a substantial altitude of aircraft B at position F where aircraft A is just leaving the ground.

Figure 7:
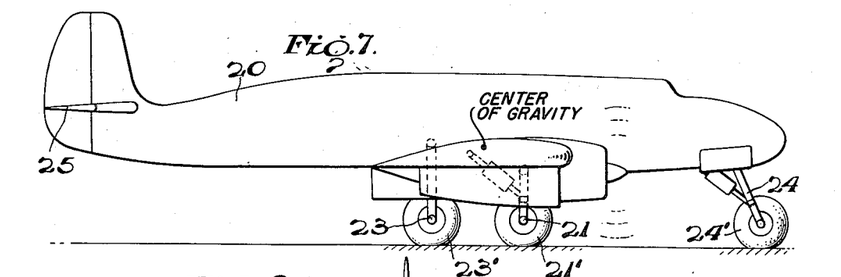
Figure 7 is a side elevation of an aircraft illustrating a third form of the invention, namely an embodiment including three main struts carrying the main wheels and a wheeled front strut.
Figure 8:
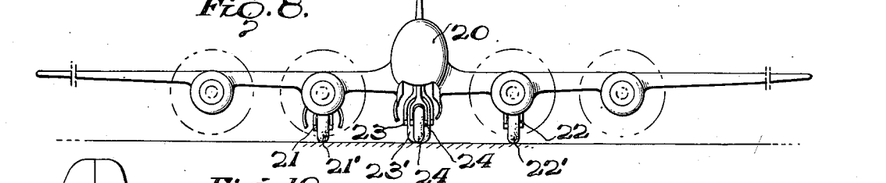
Figure 8 is a front elevation of the aircraft shown in Figure 7.

The centers of gravity of the airplanes shown respectively in Figs. 1 and 7 are marked in each case.

From the foregoing it will be understood that the present invention contemplates the successive retraction of selected portions of the running gear while the aircraft is running on the ground during take-off, thereby materially reducing drag while demand for power is at its maximum. Thus, when the craft start to become airborne only a small part of the landing gear remains to be retracted and thus remove the last vestige of drag from this source.

I claim:
1. For the take-off of an airplane, the method comprising applying a horizontal propulsive thrust to the airplane to cause the airplane to move forward, applying to the ground engaging portions of the airplane at the beginning of the ground run vertical supporting forces distributed fore and aft of the center of gravity of the airplane, and modifying the distribution of said supporting forces during the ground run so that, after a given interval, the resultant of the said supporting forces is forward of the center of gravity of the airplane, whereby the moments due to the aerodynamic, thrust, inertia, and ground reaction forces on the airplane will be maintained in substantial equilibrium during the ground run.

2. In the take-off of an airplane having a fore and aft support, the improvement which comprises supporting the airplane on the ground at the beginning of the take-off fore and aft of the center of gravity of the airplane, moving the aft support forward during the take-off until the fore support is just deloaded, retracting the fore support as soon as it is deloaded and while the airplane is still supported aft on the ground and retracting the aft support when the airplane is airborne.

3. A take-off support system for an airplane comprising a nose strut located on the nose of the airplane and carrying a nose wheel, at least one main strut carrying a first main wheel located on the airplane behind its center of gravity and to the rear of the nose wheel, at least one second main strut carrying a second main wheel located forward of the first main wheel and to the rear of the nose wheel, means for deloading the nose wheel during take-off while the airplane is still on the ground, means for retracting the first main whel after the nose wheel has been retracted and the airplane is still on the ground, and means for retracting the second main wheel after the airplane is airborne.

4. For the take-off of an airplane having at least three ground engaging portions, one being located at the nose of the airplane and the other two being located fore and aft of the center of gravity of the airplane, the method comprising applying a horizontal propulsive thrust to the airplane to cause the airplane to move forward, applying to the ground engaging portions of the airplane at the beginning of the ground run vertical supporting forces distributed fore and aft of the center of gravity of the airplane, and modifying the distribution of said supporting forces during the ground run by first retracting the ground engaging portion which is located at the nose of the airplane and then retracting the ground engaging portion which is located aft of the center of gravity of the airplane, so that, after a given interval, the resultant of said supporting forces is forward of the center of gravity of the airplane, whereby the moments due to the aerodynamic, thrust, inertia, and ground reaction forces on the airplane will be maintained in substantial equilibrium during the ground run.

JEAN A. TROENDLÉ.

(References on following page)

REFERENCES CITED

The following references are of record in the file of this patent:

UNITED STATES PATENTS

| Number | Name | Date |
|---|---|---|
| 1,716,439 | Gray | June 11, 1929 |
| 1,815,597 | Stickley | July 21, 1931 |
| 1,855,861 | Manor | Apr. 26, 1932 |
| 1,864,134 | Harris | June 21, 1932 |
| 1,890,553 | Young | Dec. 13, 1932 |
| 2,110,865 | Burgess | Mar. 15, 1938 |
| 2,194,596 | Henter | Mar. 26, 1940 |
| 2,338,046 | Lloyd | Dec. 28, 1943 |
| 2,375,449 | Unger et al. | May 8, 1945 |

FOREIGN PATENTS

| Number | Country | Date |
|---|---|---|
| 505,263 | Great Britain | May 4, 1939 |
| 510,164 | Great Britain | July 27, 1939 |
| 726,614 | Germany | Oct. 16, 1942 |